United States Patent Office 3,429,944
Patented Feb. 25, 1969

---

3,429,944
PREPARATION OF NORMAL MONO-OLEFINS
Paul Joseph Kuchar, Des Plaines, Ill., assignor to Universal Oil Products Company, Des Plaines, Ill., a corporation of Delaware
No Drawing. Filed Dec. 27, 1967, Ser. No. 693,731
U.S. Cl. 260—683.3                                        10 Claims
Int. Cl. C07c 5/18; B01j 11/16

ABSTRACT OF THE DISCLOSURE

A process for the preparation of normal mono-olefins having about 6 to about 20 carbon atoms from the corresponding normal paraffin hydrocarbon, involving the contacting of the normal paraffin hydrocarbon with a non-acid, alumina-supported, platinum metal-containing catalyst at dehydrogenation conditions, is improved by using the catalyst in a particle size having a maximum dimension not greater than 1/32 inch.

---

The subject of the present invention is an improvement in a process for the preparation of normal mono-olefins having about 6 to about 20 carbon atoms. More specifically, the present invention encompasses a method of improving the conversion, selectivity, and stability of a catalytic dehydrogenation procedure which utilizes a non-acid, alumina-supported, platinum metal-containing catalyst to transform normal paraffin hydrocarbons to the corresponding normal mono-olefin with minimum production of side products. The improvement of the present invention evolved from my investigation of the effects of catalyst particle size on the reactions induced by this type of catalyst system when a normal paraffin is charged to it. Quite unexpectedly, I found that the performance of this catalyst system could be substantially improved by using the catalyst in a critical particle size, and the improvement was not only with regard to catalyst activity but encompassed surprising improvement in its stability and selectivity characteristics. Quantitatively, I have found that using the catalyst in a particle size having a maximum dimension not greater than 1/32 inch improves its activity, stability, and selectivity characteristics.

Although extensive work has been done in the general area of production of mono-olefins from paraffins, the chief effort in the past has been primarily concentrated on lower molecular weight paraffins (i.e. paraffins having 2 to 6 carbon atoms). This concentration of effort was basically caused by the ready availability of large quantities of these paraffins and, probably, by the building-block nature of the product olefins—for example, ethylene. Recently, attention within the chemical and petroleum industry has been focused upon the problem of acquiring longer chain mono-olefins. In particular, a substantial demand has been established for normal mono-olefins having 6 to 20 carbon atoms. As might be expected, this demand is primarily a consequence of the growing commercial importance of the products that can be synthesized from these normal mono-olefins. For example, derivatives of normal mono-olefins have become of substantial importance to the detergent industry because these normal mono-olefins can be used to alkylate an alkylatable aromatic, such as benzene, and the resulting arylalkane can be transformed into a wide variety of biodegradable detergents such as the alkylaryl sulfonate (anionic) type of detergent which is most widely used for household, commercial and industrial purposes. Another type of detergent produced from this arylalkane is alkylaryl-polyoxyalkylated amine. Still another large class of detergents produced from these normal mono-olefins are the oxyalkylated phenol derivatives in which the alkyl-phenol base is prepared by alkylation of phenol.

Other uses of the long-chain mono-olefins include direct sulfation to form biodegradable alkylsulfates of the type R—$OSO_3Na$; direction sulfonation with sodium bisulfite to make biodegradable sulfonates of the type $RSO_3Na$; hydration to alcohols which are used to produce plasticizers or synthetic lube oils of the general type A—$(COOR)_2$, where A—$(COOR)_2$ is a dibasic acid such as phthalic or sebacic; hydration into alcohols followed by dehydrogenation to form ketones which can be used in the manufacture of secondary amines by reductive alkylation; ester formation by direct reaction with acids in the presence of a catalyst such as $BF_3$-etherate; and, in the preparation of di-long chain alkylbenzenes, of which the heavy metal sulfonate salts are prime lube oil detergents.

Responsive to this demand for these normal mono-olefins, the art has developed a number of alternative methods to produce them in commercial quantities. One method, that recently has achieved some measure of success involves the selective dehydrogenation of a normal paraffin hydrocarbon by contacting the hydrocarbon and hydrogen with a non-acid, alumina-supported, platinum metal-containing catalyst. As is the case with most catalytic procedures, the principal measure of effectiveness for this method involves the ability to perform its intended function, with minimum interference from said reactions, for extended periods of time. In concrete terms, this means the ability to sustain a high level of conversion, at high selectivity, for extended periods of time. Accordingly, the parameters governing the effectiveness of this method are; conversion as measured by wt. percent of the charged normal paraffin stream that is converted, selectivity as measured by the wt. percent of the desired mono-olefins contained in the conversion products and the rate of change of the conversion and selectivity parameters—known respectively as conversion stability and selectivity stability. It is evident that the principal research goals for this type of dehydrogenation method include improvements in any or all of these performance parameters. And I have now found a critical limitation on catalyst particle size that enables the conversion, conversion stability, and selectivity of this dehydrogenation method to be dramatically increased.

The improved selectivity for the normal mono-olefin, that is, a feature of the present invention, is particularly important in an embodiment of this dehydrogenation method wherein unreacted normal paraffins are recovered from the effluent stream therefrom, and recycled to extinction. Recycling of the unreacted normal paraffin hydrocarbons is necessitated by the fact that equilibrium considerations limit the conversion level that can be attained in this dehydrogenation method to a value which is typically about 10 to 20 wt. percent of the normal paraffin charge; accordingly, economic considerations dictate that the unreacted normal paraffin hydrocarbons be recovered and decycled to extinction. However, it has been found that undesired side products of the dehydrogenation reaction—such as non-normal paraffins, naphthenes, and aromatics having a boiling range that overlaps that of the normal paraffin charge stream to the dehydrogenation zone—can accumulate in the recycle stream and cause dehydrogenation catalyst instability and degradation in product quality. This problem is controlled at its source by the present invention by virtue of the fact that the high selectivity for normal mono-olefins, that is, a feature of the present invention severely limits the amount of side products that are formed.

It is, accordingly, an object of the present invention to improve the conversion and conversion stability levels attained in a process for the dehydrogenation of a normal paraffin hydrocarbon using a non-acid, alumina-supported, platinum metal-containing catalyst. Another object is to improve the selectivity for normal mono-olefins of such a process. Still another object relates to a selective catalytic dehydrogenation wherein unreacted normal paraffins are recovered and recycled to extinction, the object being to improve the stability of the catalyst used therein.

In a broad embodiment, the present invention relates to an improvement in a process for the preparation of a normal mono-olefin. In this process hydrogen and a hydrocarbon stream, containing a normal paraffin hydrocarbon having 6 to about 20 carbon atoms, are contacted with a dehydrogenation catalyst comprising a platinum metal component, an alkali component and an alumina component. Moreover, this contacting is performed at conditions, including a temperature of about 750° F. to about 1100° F., effecting the formation of a normal mono-olefin having the same number of carbon atoms as the normal paraffin hydrocarbon. In this case, the improvement comprises using the dehydrogenation catalyst in a particle size having a maximum dimension not greater than 1/32 inch. In another broad embodiment, the present invention relates to an improvement in a process for the dehydrogenation of a normal paraffin hydrocarbon. In this process, hydrogen and a hydrocarbon stream containing a normal paraffin hydrocarbon having about 6 to about 20 carbon atoms are contacted with a dehydrogenation catalyst comprising a platinum metal component, an alkali component, and alumina component at dehydrogenation conditions selected to form a normal mono-olefin having the same number of carbon atoms as the normal paraffin hydrocarbon. An effluent stream is withdrawn from contact with the catalyst and separated into a hydrogen-rich gaseous phase and a hydrocarbon-rich liquid phase; and an unreacted normal paraffin hydrocarbon-containing stream is recovered from the resulting hydrocarbon-rich liquid phase and recycled to the dehydrogenation step. Furthermore, non-normal hydrocarbons having a boiling point range over-lapping the boiling range of the unreacted normal paraffin hydrocarbons are synthesized in the dehydrogenation step and accumulate in the unreacted normal paraffin recycle stream with resultant deactivation of the dehydrogenation catalyst. Here, the improvement of the present invention comprises using the dehydrogenation catalyst in a particle size having a maximum dimension not greater than 1/32 in., thereby reducing the synthesis of non-normal hydrocarbons in the dehydrogenation step and improving the activity stability of said dehydrogenation catalyst.

Other embodiments and objects of the present invention encompass further details about: the hydrocarbon streams that can be charged thereto, the type of catalyst used therein, the process conditions associated therewith, the mechanics of the operation thereof, etc. These additional objects and embodiments will become evident from the following discussion of the elements of the present invention.

Before proceeding to a detailed discussion of the elements of the present invention, it is advantageous to define certain terms and phrases used herein. The phrase "liquid hourly space velocity" (LHSV) equals the equivalent liquid volume of the hydrocarbon stream charged to the conversion zone per hour divided by the volume of the zone containing catalyst. The phrase "normal or straight-chain hydrocarbons" refers to hydrocarbons having their carbon atoms linked in a continuous non-branched chain. The term "alkali" when it is employed in conjunction with a description of a catalyst component refers to a component selected from the group consisting of alkali metals, alkaline earth metals, and compounds thereof. The phrase "non-acid catalyst" refers to the type of catalyst which the art would consider to have little or no ability to catalyze reactions which are thought to proceed by carbonium ion mechanisms such as isomerization, cracking, hydrogen transfer, alkylation, etc.; in particular, as used herein, it refers to a platinum-alumina composite that has combined therewith an alkali component with the intent of substantially eliminating acid sites in the catalyst.

The hydrocarbon stream that can be charged to the process of the present invention contains a normal paraffin hydrocarbon having at least 6 carbon atoms and especially 9 to about 20 carbon atoms. Representative members of this class are: hexane, heptane, nonane, decane, undecane, dodecane, tridecane, tetradecane, pentadecane, hexadecane, heptadecane, octadecane, eicosane, and mixtures thereof. The present invention is particularly applicable to charge streams containing normal paraffins of about 10 to about 15 carbon atoms since these produce mono-olefins which can be utilized to make detergents having superior biodegradability and detergency. For example, a mixture containing a 4 to 5 homologue spread such as $C_{10}$ to $C_{13}$, $C_{11}$ to $C_{14}$, or $C_{11}$ to $C_{15}$ provides an excellent charge stock. Moreover, it is preferred that the amount of non-normal hydrocarbon present in this normal paraffin stream be kept at low levels. Thus, it is preferred that this stream contain greater than 90 wt. percent normal paraffin hydrocarbons, with best results achieved at purities in the range of 96 to 98 wt. percent or more. It is within the scope of the present invention to pretreat the normal paraffin charge stock by any suitable means for removing aromatic compounds; for example, by contacting it with a solution of sulfuric acid. In a preferred embodiment, the hydrocarbon stream that is charged to the process of the present invention is obtained by subjecting a hydrocarbon distillate containing normal paraffins within the aforementioned range to a separation operation employing a bed of molecular sieves which, as is well-known, have the capability to produce hydrocarbon streams having a very high concentration of normal components. A preferred separation system for accomplishing this is adequately described in U.S. Patent No. 3,310,486 and reference may be had thereto for details about such a separation system.

For example, a preferred procedure would involve charging a kerosine fraction boiling with the range of about 300° F. to about 500° F. to the separation system of the type described in U.S. 3,310,486 and recovering therefrom a hydrocarbon stream containing a mixture of normal paraffins in the $C_{10}$ to $C_{15}$ range. Typically, this last procedure can be performed so that the hydrocarbon stream recovered contains 95 wt. percent or more normal paraffin hydrocarbons.

As is pointed out hereinbefore, the catalyst used in the conversion zone of the present invention comprises: an alumina component, a platinum metal component, and an alkali component. Although it is not essential, it is generally preferred that the catalyst also contains a component selected from the group consisting of arsenic, bismuth, antimony, sulfur, selenium, tellurium, and compounds thereof.

The alumina component of this dehydrogenation catalyst generally has an apparent bulk density less than about 0.50 gram per cc. with a lower limit of about 0.15 gram per cc. The surface area characteristics are such that the average pore diameter is about 20 to about 300 angstroms; the pore volume is about 0.10 to about 1.0 milliliter per gram; and the surface area is about 100 to about 700 square meters per gram. It may be manufactured by any suitable method including a well-known alumina sphere manufacturing procedures detailed in U.S. Patent No. 2,620,314.

The alkali component of this dehydrogenation catalyst is selected from both alkali metals—cesium, rubidium, potassium, sodium, and lithium—the alkaline earth metals—calcium, magnesium, and strontium. The preferred component is lithium. Generally, the alkali component is present in an amount based on the elemental metal of less than about 5% by weight of the total composite with a value in the range of about 0.01 wt. percent to about 1.5 wt. percent generally being preferred. In addition, the alkali component may be added to the alumina in any suitable manner, especially in an aqueous impregnation thereof, and thus suitable compounds are the chlorides, sulfates, nitrates, acetates, carbonates, etc.; for example, an aqueous solution of lithium nitrate gives excellent results. It may be added either before or after the other components are added or during alumina formation—for example, to an alumina hydrosol before the alumina carrier material is formed therefrom.

The platinum metal component is generally selected from the group of palladium, iridium, ruthenium, rhodium, osmium, and platinum—with platinum giving best results. It is used in a concentration calculated on an elemental basis of about 0.5 wt. percent to about 5.0 wt. percent of a catalytic composite. This component may be composited in any suitable manner with impregnation by water soluble compounds such as chloroplatinic acid being especially preferred.

Preferably, the dehydrogenation catalysts contains a fourth component selected from the group consisting of arsenic, antimony, bismuth, sulfur, selenium, tellurium, and compounds thereof. Arsenic is particularly preferred. This component is typically used with good results in an amount of about 0.01% to about 1.0% by weight of the final composite. Moreover, this component is preferably present in an atomic ratio to the platinum metal component of about 0.1 to about 0.8 with intermediate concentrations of about 0.2 to about 0.5 being highly effective. This component can be composited in any suitable manner—a particularly preferred way being via a water soluble impregnation solution such as arsenic pentoxide, etc.

This preferred catalytic composite is thereafter typically subjected to conventional drying and calcination treatments at temperatures in the range of 800° F. to about 1000° F. Additional details as to typical dehydrogenation catalysts suitable for use in the present invention are given in the teachings of U.S. Patent Nos. 3,291,755 and 3,310,599.

It is an essential feature of the present invention that the dehydrogenation catalyst is used in a particle size having a maximum dimension not greater than $\frac{1}{32}$ inch. And preferably, the dehydrogenation catalyst is utilized in a particle size of about 20 to 40 mesh in the U.S. sieve series. Particles of this size are conveniently formed, as is shown in the examples, by making a catalyst of a larger particle size and grinding, with suitable means, the larger particles to obtain particles of the desired mesh size.

According to the present invention, a hydrocarbon stream containing a normal paraffin and hydrogen are admixed and charged to a conversion zone containing a fixed bed of the dehydrogenation catalyst in a particle size having a maximum dimension not greater than $\frac{1}{32}$ inch. The principal function of the hydrogen is to aid in controlling the rate of carbonaceous formation on the catalyst. It may be once-through hydrogen or recycle hydrogen; however, since the dehydrogenation reaction produces a surplus of hydrogen, it ordinarily is obtained by separating a hydrogen-rich gas from the effluent from the conversion zone and recycling it through compressive means to the conversion zone. Furthermore, hydrogen is utilized in an amount such that the ratio of moles of hydrogen to moles of hydrocarbon charged to the conversion zone is about 1 to about 20 with about 5 to 15 giving improved results.

In some cases, it may be advantageous to utilize a relatively inert diluent in the mixture charged to the conversion zone. Suitable diluents are steam, methane, $CO_2$, benzene, toluene, etc.

Although acceptable results are obtained when the process of the present invention is conducted at a temperature of about 750° F. to about 1100° F., it is preferred to operate within the range of about 800° to about 950° F. Similarly, the pressure utilized in the conversion zone can be within the range of about 10 p.s.i.g. to about 100 p.s.i.g., with best results obtained in the range of 15 p.s.i.g. to 40 p.s.i.g. In addition, a LHSV of about 10 to 40 hr.$^{-1}$ is preferably utilized.

The effluent stream withdrawn from the conversion zone is typically cooled and separated, in a separating zone, into a hydrogen-rich vapor phase and a hydrocarbon-rich liquid phase containing unreacted normal paraffin hydrocarbons and the normal mono-olefin hydrocarbons. In general, it is necessary to recover the unreacted normal paraffin hydrocarbons from this hydrocarbon-rich liquid phase in order to make the dehydrogenation process economically attractive. This recovery can be accomplished in any suitable manner such as by passing the hydrocarbon-rich liquid phase through a bed of suitable adsorbent which selectivity retains the mono-olefins contained therein. Typical adsorbents of this type include activated silica gel in particle form, activated charcoal, activated alumina, etc. The resultant olefin-free stream is then recycled to the conversion zone.

A preferred method for recovering the unreacted normal paraffins involves an alkylation step wherein the hydrocarbon-rich liquid phase is passed along with a stream containing an alkylatable aromatic to an alkylation zone containing a suitable acid-acting alkylation catalyst such as an anhydrous solution of hydrogen fluoride. The mono-olefins react therein with the alkylatable aromatics while the normal paraffins remain substantially unchanged. The unreacted normal paraffins can then be easily recovered from the effluent from the alkylation zone by means of a suitable fractionation system, and recycled to the conversion zone. For additional details as to suitable catalysts, conditions, and mechanics of the alkylation step, reference may be had to U.S. Patent Nos. 3,249,650 and 3,200,163.

The following examples are introduced to illustrate further the novelty, mode of operation, and utility of the present invention. It is not intended to limit unduly the present invention thereby. These examples were all performed in a laboratory scale dehydrogenation plant comprising a reactor, a hydrogen separating zone, heating and cooling means, a charge pump, recycle gas compressor, product recovery and analysis means and the like equipment. In this plant, a hydrocarbon charge stock and hydrogen are heated to the desired conversion temperature and contacted with the catalyst which is maintained as a fixed bed in the reactor. An effluent stream is withdrawn from the reactor, cooled, and passed into the hydrogen separator wherein a hydrogen-rich gas phase separates from a hydrocarbon rich liquid phase. A portion of hydrogen-rich gas phase is recycled to the reactor and the remainder is recovered as excess recycle gas. The hydrocarbon-rich liquid phase is recovered as a product stream and subjected to analysis to determine conversion and selectivity as will be indicated below.

Example I

A dehydrogenation catalyst was manufactured from a commercially available alumina carrier material by impregnating it with chloroplatinic acid and lithium nitrate at conditions effecting the incorporation in the finished catalyst of 0.75 wt. percent platinum and 0.5 wt. percent lithium, both on an elemental basis. The alumina carrier material was prepared substantially according to the method given in U.S. Patent 2,620,314, and comprised spherical particles of approximately $\frac{1}{16}$ in. in diameter. The resulting catalyst was divided into two portions, A and B, and portion B was ground in a commercial grinder to give a catalyst having a particle size of 20 to 40 mesh in the U.S. sieve series.

Both of these catalysts were then separately evaluated in the dehydrogenation plant at conditions including a reactor outlet pressure of 20 p.s.i.g., a hydrogen to hydrocarbon mole ratio of 8.0, a liquid hourly space velocity of 32, and a conversion temperature of 850–860° F.

The charge stock utilized in both cases contained 99.9 vol. percent n-dodecane and 2000 wt. p.p.m. of water, and 400 wt. p.p.m. of sulfur as tertiary butylmercaptan.

Both runs consisted of 6 periods of 6 hours each with analysis of the effluent performed at the end of each period. Results of these analyses are given in Table I.

TABLE I.—RESULTS OF COMPARISON RUNS

| Periods | I | II | III | IV | V | VI |
|---|---|---|---|---|---|---|
| Cat. A, conversion | 10.9 | 10.6 | 9.9 | 9.6 | 8.8 | 8.6 |
| Cat. A, selectivity | 88.1 | 90.6 | 91.9 | 90.6 | 88.7 | 91.9 |
| Cat. B, conversion | 9.8 | 9.6 | 9.6 | 9.8 | 10.5 | 9.3 |
| Cat. B, selectivity | 97.0 | 95.9 | 95.8 | 95.9 | 88.6 | 95.7 |

NOTE.—(1) conversion is based on wt. percent dodecane disappearance; (2) selectivity is based on wt. percent of total product converted to normal dodecene.

Recalling that Catalyst A is used in the form of $\frac{1}{16}$ in. particle and Catalyst B is in a particle size of 20–40 mesh particles, the effect of the particle size variation can be clearly seen from Table I to be a pronounced increase in selectivity for the desired mono-olefin coupled with a much slower decrease in conversion level—expressed on a barrel per pound of catalyst basis, the average rate of decline of conversion for Catalyst B was 0.02 wt. percent per bbl./lb. while that for Catalyst A was 0.18 wt. percent per bbl./lb. Accordingly, it is evident that the catalyst having the smaller particle size was about 10 times more stable than the catalyst having a $\frac{1}{16}$ in. particle size. And more surprisingly, the small particle size catalyst was much more selective for the desired mono-olefin.

Example II

A dehydrogenation catalyst was manufactured according to the teachings of U.S. Patent 3,291,855, and found to contain on an elemental basis 0.079 wt. percent arsenic, 0.75 wt. percent platinum, 0.50 wt. percent lithium, all composited with an alumina carrier material. This catalyst was manufactured in a spherical particle size of about $\frac{1}{16}$ in. in diameter and a portion of it was designated Catalyst C. Another portion of it was ground to granules of 20 to 40 mesh, and is hereinafter designated as Catalyst D.

Both catalysts are then separately subjected to a high stress evaluation test in the dehydrogenation plant at an outlet pressure of 20 p.s.i.g., a LHSV of 32, a constant conversion temperature of 860° F. and hydrogen to hydrocarbon mole ratio of about 9.0. This test consists of four periods of four hours: the first being a line-out period and the rest being evaluation periods. It is to be emphasized that this test is run at a constant temperature of 860° F.

The charge stock used in both tests was a $C_{11}$–$C_{14}$ normal paraffin containing 28 wt. percent n-$C_{11}$, 31.2 n-$C_{12}$, 25.6 n-$C^{13}$, 13.3 n-$C^{14}$, and trace amounts of non-normal paraffins, naphthenes, and aromatics boiling in $C_{11}$–$C_{14}$ range. To this charge stock there was added wt. 2000 p.p.m. of water.

Results for the 3 test periods are given in Table II in terms of wt. percent of charge stock converted to normal mono-olefins.

TABLE II.—PRODUCT SUMMARY

| Catalyst | Period 2 | Period 3 | Period 4 | Average |
|---|---|---|---|---|
| C | 7.3 | 8.3 | 7.3 | 7.6 |
| D | 13.7 | 12.3 | 13.6 | 13.2 |

Because of a minor variation in $H_2$/HC ratios during the run there is a minor amount of scatter associated with these results; nevertheless, it is clear from the data that operating with the smaller mesh catalyst gives significantly improved results. In terms of average conversion level it is 13.2 wt. percent as contrasted with 7.6 wt. percent or an improvement in conversion of about 70% in an identical test.

Example III

Another catalyst was manufactured according to the same procedure as used in Example II. Analysis of the resulting catalyst showed it to contain 0.75 wt. percent platinum, 0.5 wt. percent lithium, about 0.0825 wt. percent arsenic, all composited with an alumina carrier material. One portion of this catalyst was used in a spherical particle size of $\frac{1}{16}$ in. in diameter and is designated Catalyst E herein. Another portion of it was ground to 20 to 40 mesh, and is called Catalyst F herein.

Once again separate tests were run in the dehydrogenation plant with both of the catalysts at the following conditions: an outlet pressure from the reactor of 30 p.s.i.g., a LHSV of 32, a constant conversion temperature of 869° F., and a hydrogen to hydrocarbon mole ratio of about 8.

The charge stock used in both runs was a $C_{11}$–$C_{14}$ hydrocarbon stream containing about 96.8 wt. percent normal paraffins in the $C_{11}$ to $C_{14}$ range and about 3.2 wt. percent of non-normal paraffins, olefins, naphthenes and aromatics boiling in the $C_{11}$ to $C_{14}$ range. In addition, 2000 wt. p.p.m. of water was added to it.

The test runs consisted of 4 periods of 4 hours of which the first was a line-out period. Results for each catalyst are given in Table III in terms of wt. percent of charge stock converted to normal mono-olefin.

TABLE III.—COMPARATIVE RESULTS OF TESTS

| Catalyst | Period 2 | Period 3 | Period 4 | Average conversion |
|---|---|---|---|---|
| E | 8.8 | 9.4 | 8.7 | 9.1 |
| F | 9.9 | 10.5 | 9.2 | 10.1 |

As can be seen from Table III, the conversion level attained was once again much superior with the small mesh catalyst. Additionally, a mass spectrometer analysis of the composite product for each of the catalysts showed that the total amounts of non-normal hydrocarbon synthesized during the course of the run for Catalyst E was 1.40 wt. percent while it was only 0.90 wt. percent for Catalyst F. This result evidences the enhanced selectivity of the smaller particle size for normal mono-olefin production which is an important advantage of the present invention, especially in an embodiment where the unreacted normal paraffins are separated from the product stream and recycled to the dehydrogenation zone.

I claim as my invention:

1. In a process for the preparation of a normal mono-olefin wherein hydrogen and a hydrocarbon stream, containing a normal paraffin hydrocarbon having 6 to about 20 carbon atoms, are contacted with a dehydrogenation catalyst comprising a platinum metal component, an alkali component and an alumina component and wherein the contacting is performed at conditions, including a temperature of about 750° F. to about 1100° F., effecting the formation of a normal mono-olefin having the same number of carbon atoms as the normal paraffin hydrocarbon; the improvement comprising using said dehydrogenation catalyst in a particle size having a maximum dimension not greater than $\frac{1}{32}$ inch.

2. The improved process of claim 1 further characterized in that said dehydrogenation catalyst contains a component selected from the group consisting of arsenic, antimony, bismuth, sulfur, selenium, tellurium, and compounds thereof.

3. The improved process of claim 1 further characterized in that said dehydrogenation catalyst is used in a particle size of about 20 to 40 mesh.

4. The improved process of claim 1 further characterized in that said normal paraffin hydrocarbon contains about 10 to 15 carbon atoms.

5. The improved process of claim 1 further characterized in that said normal paraffin hydrocarbon is dodecane.

6. The improved process of claim 1 further characterized in that said hydrocarbon stream contains a mixture of normal paraffin hydrocarbons boiling in the $C_{10}$ to $C_{15}$ range.

7. The improved process of claim 2 further characterized in that said dehydrogenation catalyst comprises: alumina, about 0.01 wt. percent to about 1.5 wt. percent of lithium, about 0.05 wt. percent to about 5.0 wt. percent platinum and arsenic in an atomic ratio of about 0.1 to about 0.8 atom of arsenic per atom of platinum.

8. The improved process of claim 1 further characterized in that said conditions include a pressure of about 10 p.s.i.g. to about 100 p.s.i.g. and a LHSV of about 10 to 40 hr.$^{-1}$.

9. In a process for the dehydrogenation of a normal paraffin hydrocarbon wherein hydrogen and a hydrocarbon stream, containing a normal paraffin hydrocarbon having about 6 to about 20 carbons atoms, are contacted with a dehydrogenation catalyst comprising a platinum metal component, an alkali component, and an alumina component at dehydrogenation conditions selected to form a normal monoolefin having the same number of carbon atoms as said normal paraffin hydrocarbon, wherein an effluent stream is withdrawn from contact with said catalyst and separated into a hydrogen-rich gaseous phase and a hydrocarbon-rich liquid phase, wherein an unreacted normal paraffin hydrocarbon-containing stream is recovered from the resulting hydrocarbon-rich liquid phase and recycled to the dehydrogenation step, and wherein non-normal hydrocarbons having a boiling point range overlapping the boiling range of said unreacted normal paraffin hydrocarbons are synthesized in said dehydrogenation step and accumulate in the unreacted normal paraffin recycle stream with resultant deactivation of said dehydrogenation catalyst, the improvement comprising using said dehydrogenation catalyst in a particle size having a maximum dimension not greater than $\frac{1}{32}$ inch, thereby reducing the synthesis of non-normal hydrocarbons in the dehydrogenation step and improving the activity stability of said dehydrogenation catalyst.

10. The improved process of claim 9 further characterized in that said dehydrogenation catalyst is used in particle size of about 20 to 40 mesh.

References Cited

UNITED STATES PATENTS

| | | | |
|---|---|---|---|
| 3,126,426 | 3/1964 | Turnquest et al. | 260—683.3 |
| 3,291,855 | 12/1966 | Haensel | 260—683.3 |
| 3,293,319 | 12/1966 | Haensel et al. | 260—683.3 |
| 3,315,007 | 3/1967 | Abell et al. | 260—683.3 |
| 3,315,008 | 3/1967 | Abell et al. | 260—683.3 |
| 3,360,586 | 12/1967 | Bloch et al. | 260—683.3 |

DELBERT E. GANTZ, *Primary Examiner.*

G. E. SCHMITKONS, *Assistant Examiner.*

U.S. Cl X.R.

260—680